May 15, 1962  R. W. STARR  3,034,635
HARVESTING APPARATUS
Filed Sept. 22, 1959  4 Sheets-Sheet 4

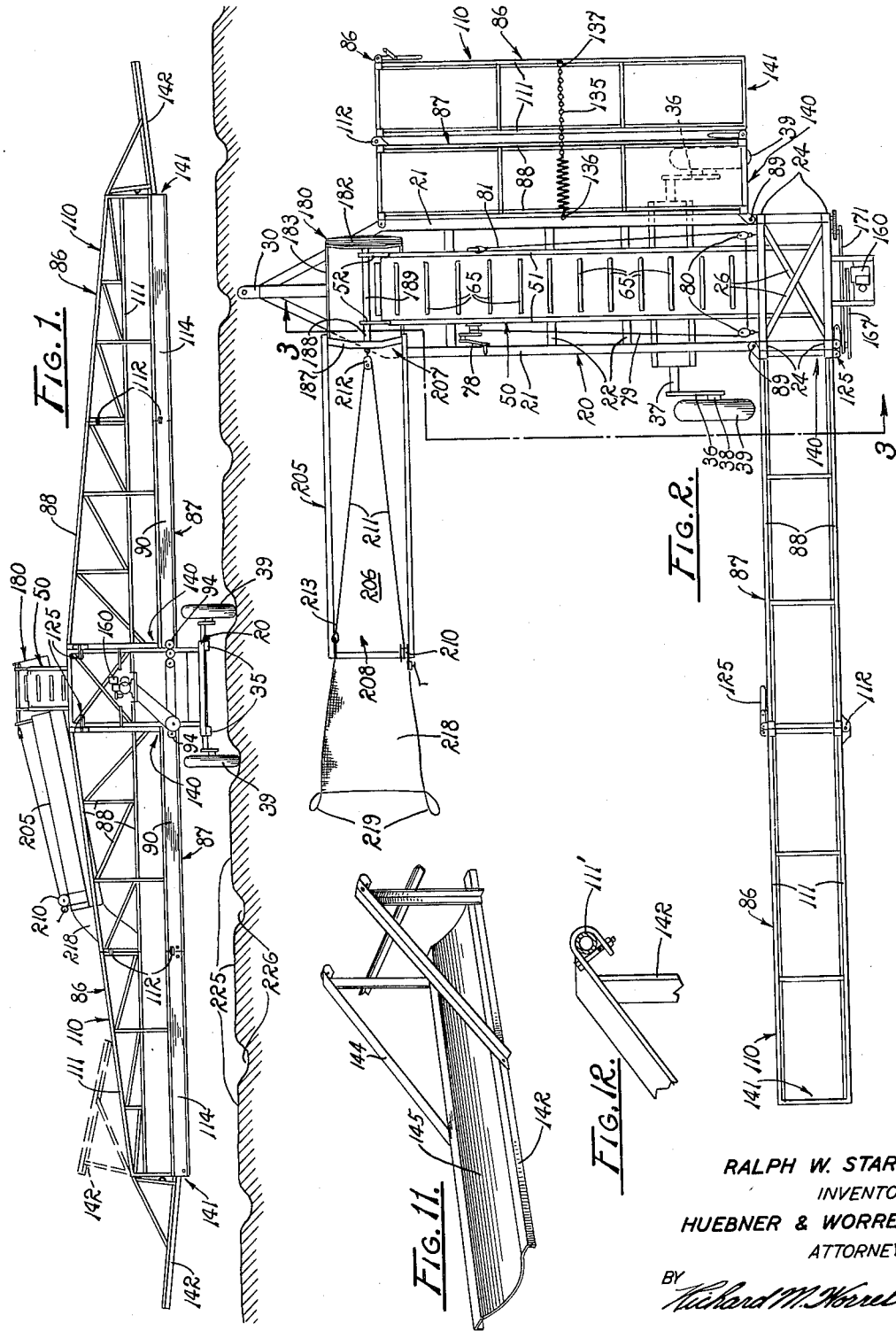

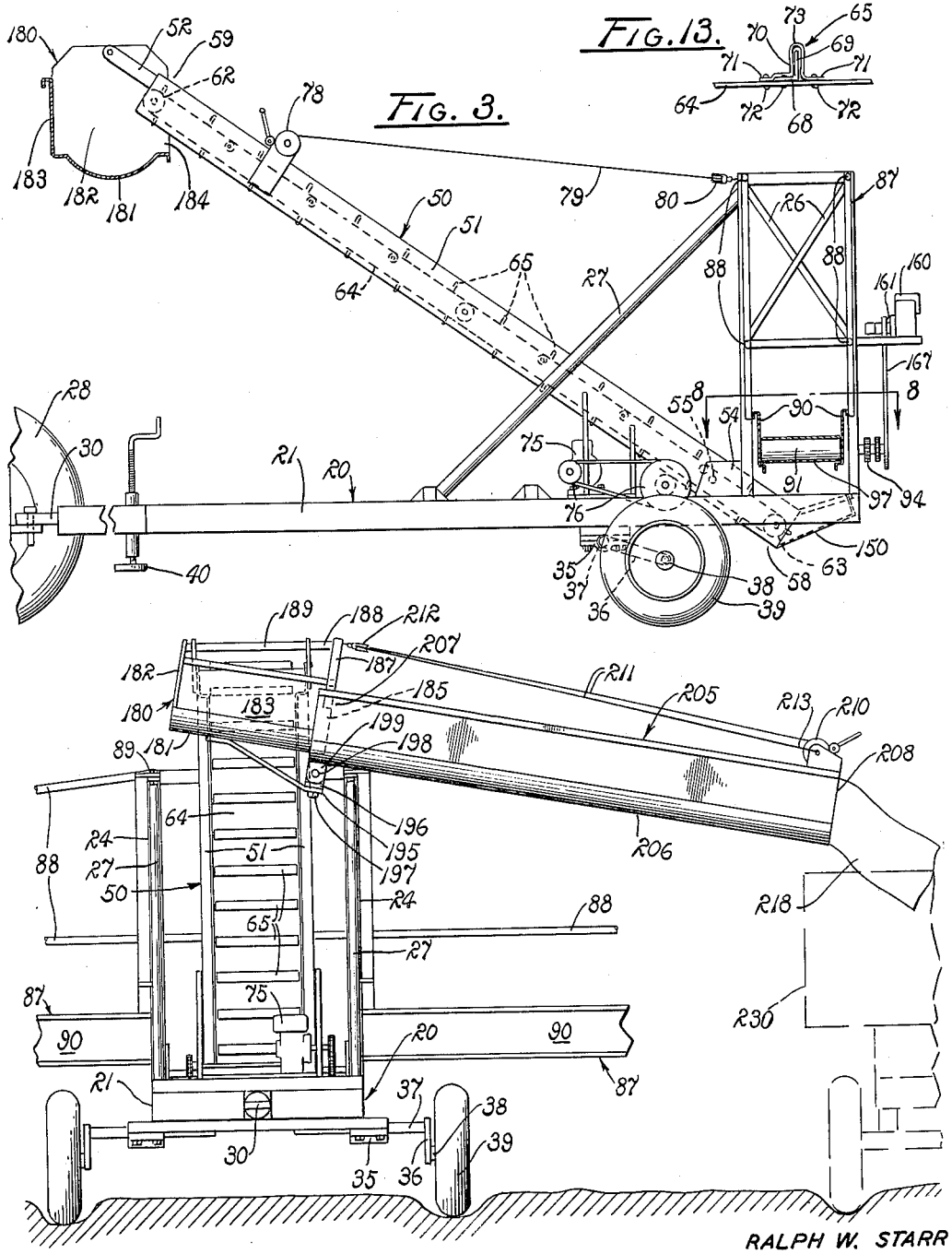

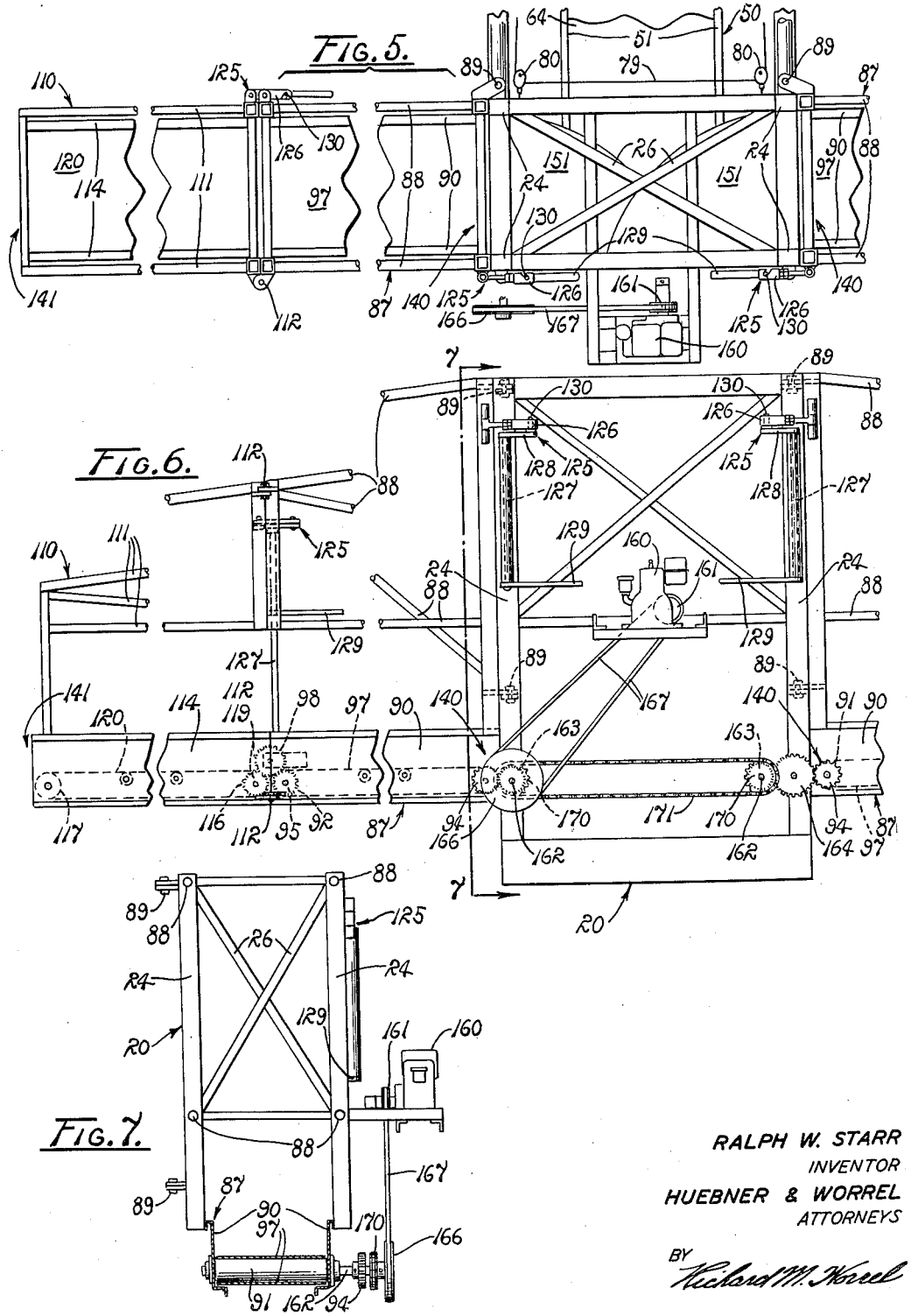

RALPH W. STARR
INVENTOR
HUEBNER & WORREL
ATTORNEYS 3,034,635
HARVESTING APPARATUS
Ralph W. Starr, Selma, Calif., assignor to Selma Trailer & Manufacturing Company, a corporation of California
Filed Sept. 22, 1959, Ser. No. 841,519
13 Claims. (Cl. 198—45)

The present invention relates to a harvesting apparatus and more particularly to an apparatus for facilitating the harvest of produce picked in the field from a plurality of longitudinally extended, transversely spaced rows.

In the harvesting of certain rows crops, such as cantaloupes, it has been the practice for pickers to walk between the rows, to pick the cantaloupes, and to place them in bags carried for such purpose. Upon filling a bag, the picker ordinarily had to carry it to some remote dumping point. This procedure was obviously slow, laborious and inefficient. Of perhaps even greater concern was the fact that the produce was handled so much that handling damage resulted. Because of worker fatigue, inexperience, or carelessness, an appreciable percentage harvested in this manner was rendered unmarketable.

Accordingly, it is an object of the present invention to provide an improved apparatus for use in the harvesting of produce picked in the field from a plurality of longitudinally extended, transversely spaced rows.

Another object is to minimize the time, labor, and expense involved in the harvesting of certain types of produce.

Another object is to reduce the amount of handling of produce during harvesting and to minimize the damage incident thereto.

Another object is to minimize damage to produce while being harvested and thereby to increase the percentage of marketable produce.

Another object is to enable produce to be preliminarily sorted during the harvesting thereof.

Another object is to provide a mobile harvester for collecting produce picked in the field and for dumping the collected produce into a truck, trailer, or the like, traveling alongside of the harvester.

Another object is to provide a conveyer for use in a machine of the nature described which handles produce conveyed in a gentle manner.

Another object is to provide such a harvester which is adapted for highway as well as field travel.

Another object is to provide such a harvester which is adjustable in width, height, and in other respects to accommodate the harvester to various operative conditions.

These, together with other objects, will become more fully apparent upon reference to the following description and accompanying drawings.

In the drawings:

FIG. 1 is a rear elevation of a harvester embodying the principles of the present invention and shown in an operative condition traveling down the rows of a field. A retracted position of an extension wing is shown in dashed lines.

FIG. 2 is a somewhat enlarged top plan view of the harvester of FIG. 1 with the wing extensions omitted and with one of the lateral feeding conveyors thereof folded inwardly to illustrate the condition of the machine as partially adapted for highway travel.

FIG. 3 is a somewhat enlarged, longitudinal section taken on line 3—3 of FIG. 2.

FIG. 4 is a fragmentary front elevation of the harvester and also shows a trailer laterally adjacent to, and in a position for receiving produce from, the harvester.

FIG. 5 is a somewhat enlarged, fragmentary top plan view of a portion of the harvester, as illustrated in FIG. 2, and with parts thereof being broken away for illustrative convenience.

FIG. 6 is a rear elevation of the apparatus illustrated in FIG. 5.

FIG. 7 is a longitudinal section taken on line 7—7 of FIG. 6.

FIG. 11 is a somewhat enlarged, detailed perspective view of one of the extension wings illustrated in FIG. 1.

FIG. 12 is a detail view of the connection between each extension wing and its adjacent outer conveying section.

FIG. 13 is a detail view of a cleat employed on the elevating conveyer.

Figure 8:
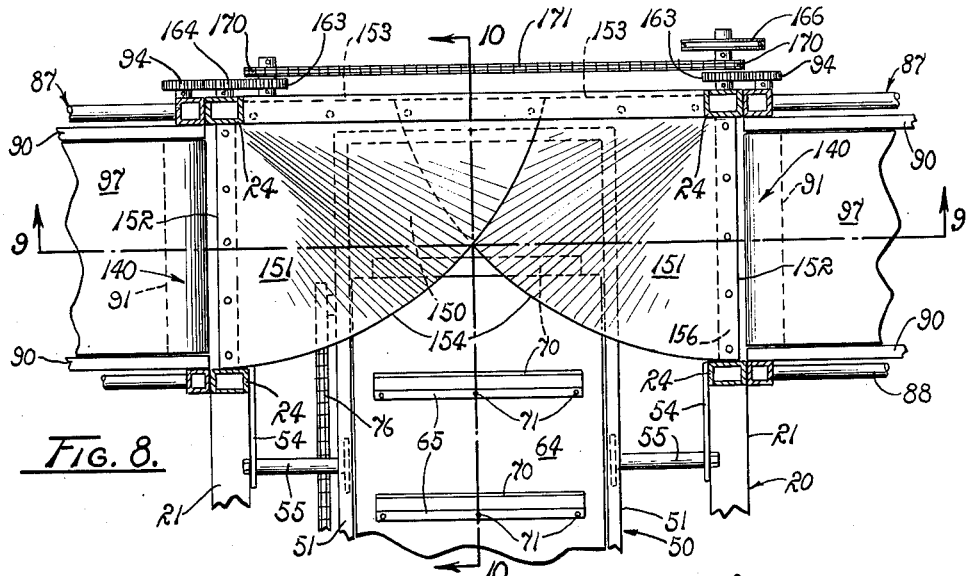
FIG. 8 is a somewhat enlarged, horizontal section taken on line 8—8 of FIG. 3.

Referring more particularly to the drawings, the harvesting apparatus of the subject invention includes a main frame 20 providing a pair of longitudinal frame members 21 rigidly interconnected by transverse frame members 22. A plurality of posts 24 are rigidly connected to the longitudinal frame members and extend upwardly therefrom in rectangular relationship to each other. A plurality of diagonal braces 26 rigidly interconnect the posts. Further, a pair of elongated struts 27 interconnect the upper ends of the forwardmost posts and the longitudinal frame members. For coupling the harvesting apparatus to a tractor, as 28, or the like, a tongue 30 is rigidly forwardly extended from the main frame.

Bearings 35 are connected to the main frame 20 underneath the rearward portion thereof, and crank axles 36 are provided including mounting members 37 rotatably releasably, transversely slidably received in coaxial alignment in the bearings. The crank axles also have oppositely outwardly extended journal members 38 on which are mounted wheels 39 for supporting the main frame in elevationally spaced relation to the ground and for earth traversing movement in a path longitudinally of the frame. A jack 40 is connected to the main frame underneath the forward end portion thereof for supporting the main frame in a substantially horizontal position when the frame is not connected to a draft vehicle, such as the tractor 28, and for elevational adjustment of the forward end of the frame. It is also to be observed at this point that the mounting members of the crank axles can be adjusted transversely within the bearings to adjust the tracking widths of the wheels and thereby to accommodate the apparatus for operation in fields having various row spacings. Also, the rearward end portion of the main frame is elevationally adjustable on the wheels by means of the crank axles.

An elevating conveyor 50 provides a pair of side plates 51 including upwardly extended portions 52. The side plates are connected to mounting brackets 54 forwardly extended from the forward pair of posts 24 by pivot pins 55. In this manner the elevating conveyor is mounted in the frame 20 for elevational pivotal movement about a substantially horizontal axis defined by the pivot pins and above the longitudinal and transverse frame members 21 and 22. The elevating conveyor has a lower produce receiving end 58 located generally within an area bounded by the posts 24 and adjacent to the lower ends thereof. The elevating conveyor also has an upper produce discharging end 59 located generally above the forward end portion of the main frame.

The elevating conveyor 50 includes upper and lower rollers 62 and 63 rotatably mounted between the side plates 51 for rotation about axes parallel to each other and to the pivot pins 55. An elongated endless flexible conveyor belt 64 circumscribes the upper and lower rollers, and a plurality of cleats 65 are connected to the belt in substantially equally longitudinally spaced relation therealong.

As best seen in FIG. 13, each cleat 65 includes a mounting flange 68 connected to the belt and extended transversely thereof and a conveying flange 69 rigidly outwardly extended from the mounting flange with respect to the belt. The conveying flange also extends transversely of the belt and both of these flanges are preferably of rigid material, such as metal. A resiliently flexible and compressible cushion 70 of sheet material, preferably sponge rubber, loosely overlays the mounting and conveying flanges and includes opposite side edges 71 extended transversely of the belt and connected thereto by means of rivets 72. The cushion thus has a central portion 73 over the conveying flange but not connected thereto nor even snugly fitted thereabout. The cushion simply covers the rigid flanges and is made generally to conform to the shape of the flanges by its size and connection to the belt on opposite sides of the flanges. A motor 75 is mounted on the frame 20 and is suitably connected, by a pulley belt mechanism to the elevating conveyor for motivating the same.

With references to FIGS. 2 and 3, a winch 78 is mounted on one of the side plates 51 of the elevating conveyor 50 relatively adjacent the upper end 59 and includes a cable 79 extended therefrom and around a pair of pulleys 80 on the upper end of the forwardmost posts 24. The cable has an opposite end 81 connected to the other side plate 51 at a position generally opposite to the winch, as best seen in FIG. 2.

The harvesting apparatus also includes a pair of elongated feeding conveyors 86 mounted on the main frame 20 for horizontal swinging movement between laterally outwardly extended positions in alignment with each other, as illustrated in FIG. 1, and inner folded or collapsed positions in opposed relation to each other on opposite sides of the main frame. One of the feeding conveyors is illustrated in this position in FIG. 2. Specifically, each feeding conveyor has an inner conveying section 87 providing an inner frame 88 pivotally connected at 89 to its respectively adjacent forward post 24, as best illustrated in FIG. 5. The inner conveying section provides a pair of opposed side plates 90; inner and outer rollers 91 and 92 rotatably mounted in the side plates in longitudinally spaced relation to each other with respect to the side plates and in a substantially common horizontal plane with each other; an inner driven gear 94 connected to the inner roller; and an outer drive gear 95 connected to the outer roller. An endless flexible conveying belt 97 extends around the inner and outer rollers. An idler gear 98 is mounted on one of the side plates above and in mesh with the outer drive gear 95 but extends slightly outwardly from the drive gear, as illustrated in FIG. 6.

Each feeding conveyor 86 also includes an outer conveying section 110 providing an outer frame 111 pivotally connected at 112 to the inner frame 88 of its respectively associated inner conveying section 87. The outer conveying section includes a pair of side plates 114, inner and outer rollers 116 and 117 mounted in the side plates 114 for rotation about substantially horizontal axes spaced longitudinally of each other relative to the side plates and located in a substantially horizontal plane with each other and with the rollers 91 and 92.

An inner driven gear 119 is connected to the inner roller at an end thereof and is in mesh with the idler gear 98 when the inner and outer conveying sections are in alignment, as illustrated in FIG. 6. An elongated endless belt 120 of flexible material also extends around the inner and outer rollers 116 and 117. The outer frames 111 include rods 111′ extended transversely of their respective feeding conveyors 86 and in upwardly spaced relation to their respective endless belts 120.

From the foregoing, it will be evident that each feeding conveyor 86 is pivotal as a unit about its connections 89, defining a vertical pivot axis, between a transversely outwardly extended position, as illustrated in FIGS. 1 and 5, for example, and an inner folded position, as illustrated at the right side of the main frame 20 in FIG. 2. Still further, the outer conveying section 110 of each feeding conveyor is pivotal about its vertical pivot axis at 112 and relative to its respective inner section 87 between a position in longitudinal alignment with its respective inner section, as illustrated in FIGS. 1 and 5, for example, and a folded position against its respective inner section, as again illustrated on the right side of the main frame in FIG. 2. Over-center extension latches 125 interconnect adjacent inner and outer conveying sections and the main frame and the inner sections in said aligned and transversely outwardly extended positions.

The extension latches 125 are all of the same construction and, accordingly, only those which interconnect the inner conveying sections 87 and the main frame 20 are described in detail. Accordingly such latch includes a hook 126 mounted on the inner frame 88 of a feeding conveyor 86 for pivotal movement about a substantially vertical axis between a latching position extended rearwardly of an adjacent rear post 24 of the main frame and an oppositely extended retracted position. Such latch also includes a substantially upright bar 127 mounted on said rear post for rotational movement about an upright axis eccentrically of the pivot axis of the hook. The bar has an upper end adjacent to the hook and an opposite lower end. Upper and lower latching and manipulating arms 128 and 129 are rigidly radially outwardly extended from the upper and lower ends of the bar, respectively. A latching pin 130 is upwardly extended from the latching arm and fits into the hook 126 when the latter is extended rearwardly of said rear post in acute angular relation therewith. By means of the manipulating arm, the bar is then pivoted toward said rear post to move the hook into a latched position.

With reference to FIG. 2, when the inner and outer conveying sections 87 and 110 are in their fully folded and collapsed positions, a retraction latch 135 is provided to hold the conveying sections against each other and inwardly against the main frame 20. More specifically, each retraction latch has an inner spring portion 136 connected to a side frame member 21 and outer chain portion 137 releasably connected to the outwardly disposed side plate 114 of its associated outer conveying section.

Directing attention to FIG. 1, the feeding conveyors 86 provide relatively adjacent inner discharge ends 140 and relatively remote outer ends 141. Outer extension wings 142 are mounted on the outer conveying sections 110 for pivotal movement about axes substantially parallel to the axes of the outer rollers 117 between extended positions in slightly upwardly extended, obtuse angular relation with the outer conveying belts 120, as illustrated in FIG. 1, and retracted positions folded upwardly over the outer frames 111, as illustrated in dashed line at the left in FIG. 1. Each wing includes a bracket 144 releasably hingedly hooked on a rod 111′ of the frame 111, and a chute 145 providing inner and outer ends. In said extended position, the outer end is slightly above the inner end.

Figure 9:
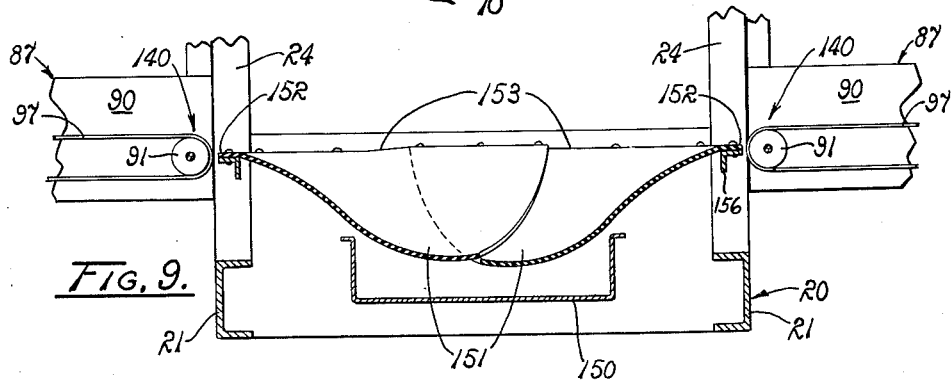
FIG. 9 is a vertical section taken on line 9—9 of FIG. 8.
Figure 10:
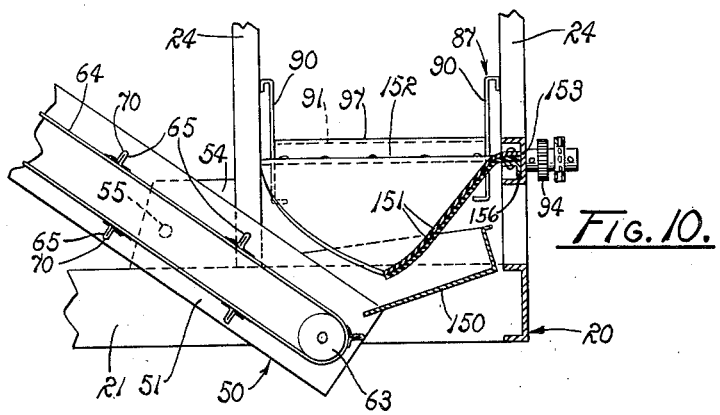
FIG. 10 is a longitudinal, vertical, fragmentary section taken on line 10—10 of FIG. 8.

With particular reference to FIGS. 8, 9, and 10, a generally U-shaped deflector panel 150 is rigidly mounted in the main frame 20 within the area defined by the posts 24 and adjacent to the lower ends thereof. As such, the panel is mounted below and intermediate the discharge ends 140 of the feeding conveyors 86, as seen in FIG. 9, and is slightly downwardly declined from the rearward posts toward the lower receiving end 38 of the elevating conveyor, as seen in FIG. 10. A pair of flexible, produce transferring sheets 151, of rubber or plastic, for example, are rigidly connected to the posts above the deflector panel. The sheets have substantially horizontal side edges 152 adjacent to the discharge ends of the feeding conveyers; aligned, partially overlapped, substantially horizontal rear edges 153; and arcuate convex forward edges 154. The forward edges are not secured directly to any support and can be considered free edges. The sheets further have inner portions which overlap above the deflector panel. The transferring sheets provide a substantially common concave surface above the deflector panel and downwardly forwardly declined toward the receiving end of the elevating conveyer. More specifically, the side and rear edges of the sheets are respectively bolted or riveted to a U-shaped, sheet frame 156 of angle iron construction and rigidly supported in the main frame 20 in a substantially horizontal position between the discharge ends of the feeding conveyers, all as best illustrated in FIGS. 8, 9, and 10. The sheet frame has side portions adjacent to and extended transversely of the feeding conveyers and a rear portion interconnecting the side portions and extended longitudinally of the conveyers in laterally offset relation to their discharge ends.

As best illustrated in FIGS. 5, 6 and 7, a drive motor 160 is borne by the main frame 20 rearwardly of the posts 24 and includes an output pulley 161. Counter shafts 162 are rotatably mounted adjacent to the lower ends of the posts 24, and are extended in substantially parallel, individually inwardly spaced relation to the inner rollers 91 of the feeding conveyers 86. Drive gears 163 are connected to the counter shafts with the drive gear on one of the counter shafts being in direct mesh with its respectively adjacent driven gear 94 on the inner roller. An idler gear 164 is interposed the other drive gear 163 and its respectively adjacent driven gear 94 of the other feeding conveyer. A driven pulley 166 is connected to the direct-drive counter shaft 162, and a pulley belt 167 extends around the output pulley 161 and this driven pulley. Further, coupling sprockets 170 are individually connected to the counter shafts, and a chain 171 is extended about the sprockets whereby energization of the drive motor imparts rotation to the counter shafts.

With particular reference to FIGS. 3 and 4, a produce transfer basket 180 provides a concave bottom wall 181, a side wall 182 upwardly extended from the bottom wall, a front wall 183 upwardly extended from the bottom wall and connected to the side wall, and rear and side openings 184 and 185 respectively opposite to the front and side walls. An arched bracket 187 is connected to the front wall and to the bottom wall. The bracket is in spaced relation to the side wall and in upwardly arched relation to the bottom wall. An elongated rod 188 rigidly interconnects the side wall and the bracket in non-parallel, oblique relation to the bottom wall, as best seen in FIG. 4. An elongated sleeve 189 rigidly interconnects the upwardly extended portions 52 of the elevating conveyer 50 and rotatably receives the rod thereby dependably supporting the basket for swinging movement about a substantially horizontal axis disposed transversely of the elevating conveyer.

A mounting bracket 195 is rigidly connected to the bottom wall 181 of the basket 180. An upwardly disposed lower U-shaped coupling 196 is connected to the mounting bracket for rotatable movement about a substantially upright pin 197 and, in turn, supports a cross pin 198 disposed generally transversely of the bottom wall. A downwardly disposed upper U-shaped coupling 199 is rotatably connected to the cross pin for rotation about an axis defined by such cross pin.

An elongated produce delivery chute 205 includes a bottom wall 206 rigidly connected to the upper coupling 199 and has an inner end 207 marginally extended underneath the bottom wall 181 of the transfer basket 180 and an opposite outer end 208. A winch 210 is supported on the outer end of the chute and includes a cable 211 extended about a pulley 212 connected to the bracket 87. The cable has an opposite end 213 connected to the outer end of the delivery chute on the opposite side thereof from the winch 210. It will be evident that during elevational adjustment of the conveyer 50, within reasonable limits, the bottom wall 181 of the transfer basket 180 remains in a laterally downwardly declined position in substantial longitudinal alignment with the bottom wall 206 of the delivery chute. Further, by means of the winch 210, the delivery chute can be angularly elevationally adjusted with respect to the transfer basket about an axis defined by the cross pin 198. The delivery chute can also be laterally angularly adjusted with respect to the transfer basket about an axis defined by the upright pin 197 simply by pushing or pulling the chute forwardly or rearwardly.

Preferably, a discharge apron 218, of flexible sheet material, is connected to the outer end 213 of the delivery chute 205, and ropes 219, or the like, are connected to opposite side edges of the apron for convenience in manual manipulation thereof.

*Operation*

The operation of the described embodiment of the subject invention is believed to be readily apparent and is briefly summarized at this point.

The subject harvesting apparatus is adapted to be driven through fields of produce including a plurality of rows 225 extended longitudinally of the field in transversely spaced relation to each other and thereby defining furrows 226 between the rows. The apparatus is driven through the field with the wheels 39 in a pair of adjacent furrows. The spacing between the wheels can be adjusted, as above described, to accommodate the apparatus for various furrow spacings. The feeding conveyers 86 are latched in their outwardly extended positions, as illustrated in FIG. 1, and the outer wings 142 are pivoted into their extended positions. The motors 75 and 160 are energized to motivate the feeding and elevating conveyers 86 and 50. A truck or trailer, as 230, is driven alongside of the apparatus underneath the outer end 208 of the delivery chute 205. Preferably, an operator is located in the truck and manually controls the position of the delivery chute.

As the apparatus moves through the field, laborers or pickers, not shown, walk behind the feeding conveyers 86 in the furrows 226 between adjacent rows 225 of produce. The laborers pick the produce in the usual manner and place them on the belts 97 and 120 and the wings 142 of the feeding conveyers 86.

The produce is conveyed inwardly of the apparatus along the belts 120 and 97 and falls from the discharge ends 140 onto the transferring sheets 151. The sheets guide the produce toward the receiving end 58 of the elevating conveyer 50. It is also to be noted that the sheets break the fall of the produce and minimize bruising thereof at this part of the conveying path. The deflector panel 150 limits downward flexing of the sheets under the weight of the produce and prevents the same from falling downwardly through the sheets onto the ground.

The produce is then conveyed upwardly by means of the elevating conveyer 50 and is discharged into the transfer basket 180. In the basket it rolls downwardly along the bottom wall 181 onto the wall 206 of the discharge chute and from there into the truck 230.

It is to be noted that damage to the produce is minimized as it travels through the elevating conveyer 50. While the cleats 65 are effective to elevate the produce along the upper run of the belt 64, the sharp edges of the rigid flanges 68 and 69 do not contact the produce. Instead, the produce engage the resiliently flexible and compressible cushions 60 overlaying the flanges. Because the cushions loosely overlay the flanges, the cushions yield when contacted by the produce and do not allow direct engagement of the produce and the flanges.

As the apparatus and truck 230 move over the field, the operator in the truck swings the delivery chute 205 horizontally about the pin 197 to direct produce into various parts of the truck thereby substantially evenly to load the truck in a plurality of successive layers. The operator utilizes the apron 218 to break the fall of the produce and thereby controllably to ease the produce into the truck. Further, as the bottom of the truck becomes filled, the operator elevates the delivery chute by means of the winch 210. Thus, the distance which the produce has to fall from the apron into the truck is minimized. Of course, the elevating conveyer 50 can be vertically adjusted by means of the winch 78 thereby to accommodate the apparatus to various size trucks or trailers.

When it is desired to collapse the apparatus, as for highway travel, for example, the extension latches 125 are released and the inner conveying sections 87 pivoted about the axes 89 into lateral side-by-side relation with the longitudinal frame members 21. Further, the outer conveying sections 110 are pivoted about their connections 112 into side-by-side relationship with their respectively adjacent inner sections. The retraction latches 135 are then connected to the outer sections to hold the conveying sections in said collapsed positions. Preferably, the extension wings 142 are folded into their retracted positions. Although not shown, the discharge chute 205 may be articulated or telescopic to meet minimum width requirements.

From the foregoing it will be evident that a harvesting apparatus has been provided which facilitates the harvesting of produce picked manually in the field. Essentially, the apparatus collects the picked produce and transfers it into a mobile receptacle, such as a truck, traveling along with the apparatus. The apparatus minimizes the time, labor, and the inconvenience previously associated with manual harvesting of such produce. Further, use of the apparatus minimizes handling of the produce by the pickers thereby resulting in less damaged, and more marketable, produce. An auxiliary advantage of the invention is that it enables preliminary sorting of the produce to be conducted on the apparatus as it travels through the field and before the produce reaches the packing house. In actual use of the invention, it has been found that the subject apparatus reduces the labor required for harvesting cantaloupes, for example, to one-half of what it was with complete manual harvesting and further results in approximately a twenty percent increase in saleable fruit. Of further significance is the fact that the apparatus can be collapsed for transportation over highways, and the like.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mobile produce harvester for transferring produce picked from a plurality of longitudinally extended, transversely spaced rows of such produce in the field into a mobile receptacle traveling adjacent to the harvester comprising a frame; means mounting the frame for earth traversing movement longitudinally of such rows of produce; an elongated elevating conveyer mounted in the frame in upwardly inclined position having opposite sides and having an upper produce discharge end and a lower produce receiving end; a pair of elongated feeding conveyers having inner discharge ends; means individually mounting the feeding conveyers on the frame on opposite sides of the elevating conveyer, in substantially horizontal elevationally spaced relation to the ground, and in substantially normal, outward extension from the elevating conveyer with their discharge ends adjacent to the receiving end of the elevating conveyer for discharging produce placed on the feeding conveyers into the elevating conveyer; a delivery chute mounted on the upper end of the elevating conveyer, extended transversely therefrom, and having an upper end beneath the discharge end of the elevating conveyer for receiving produce therefrom and a lower end positionable above such a mobile receptacle traveling alongside of the harvester for guiding produce into such receptacle, the feeding conveyers including inner and outer sections pivotally interconnected for pivotal movement about upright axes, said mounting means pivotally connecting said inner sections to the frame for pivotal movement about axes parallel to said upright axes whereby the sections of each feeding conveyer are horizontally swingable between collapsed positions longitudinally extended in side-by-side relation alongside of the elevating conveyer and extended positions with said sections in longitudinal alignment and with their respective discharge ends in produce feeding relation to the receiving end of the elevating conveyer; and means releasably interconnecting the frame and said inner sections and the respectively associated inner and outer sections of the feeding conveyer in said extended positions, each outer section being pivotally movable on its respective inner section in a different direction from that in which inner section is pivotally movable on the frame whereby each inner section is foldable inwardly adjacent to the elevating conveyer and each outer section is foldable inwardly against its associated inner section.

2. A machine for harvesting produce picked from a plurality of longitudinally extended, transversely spaced rows of such produce in a field thereof comprising an elongated frame; produce receiving means borne by the frame; and an elongated feeding conveyer including inner and outer sections pivotally interconnected for movement relative to each other about a predetermined outer axis, the inner section having an inner discharge end; and means mounting the inner end of the conveyer on the frame for pivotal movement about an inner axis substantially parallel to said outer axis between a collapsed position with the inner section folded against the frame and an extended position with the inner end in produce discharging relation to said receiving means, and the outer section of the conveyer being swingable about said outer axis between a folded position extended longitudinally alongside of the inner section and on the opposite side of the inner section from the frame when the inner section is in said collapsed position and an extended position in longitudinal alignment with the inner section.

3. The machine of claim 2 including means releasably interconnecting the inner section and the frame in the extended position of the inner section; and means releasably interconnecting the inner and outer sections in the extended position of the outer section.

4. The machine of claim 2 including means interconnecting the frame and the outer section when both of said sections are in their collapsed and folded positions respectively for holding the sections inwardly adjacent to the frame.

5. A mobile machine for harvesting produce picked from a plurality of longitudinally extended, transversely spaced rows of such produce in a field comprising a frame mounted for earth traversing movement longitudinally of such rows of produce; produce receiving means borne by the frame; an elongated feeding conveyer having an inner discharge end; means mounting the feeding conveyer on the frame adjacent to the produce receiving means, in substantially horizontal spaced relation to the ground, and in substantially normal, outward extension from the produce receiving means with said discharge end adjacent to the receiving means whereby produce placed on the feeding conveyer is discharged into the receiving means, the feeding conveyer including inner and outer sections pivotally interconnected for pivotal movement about an upright axis, said mounting means pivotally connecting the inner section of the conveyer to the frame for pivotal movement about an axis substantially parallel to said upright axis whereby the sections are horizontally swingable between a collapsed position extended alongside of the frame longitudinally of the direction of movement thereof and an extended position with each sections in longitudinal alignment with each other and with the discharge end of the conveyer in produce feeding relation to the receiving means; and means releasably interconnecting the frame and said inner section for holding the inner section in said extended position; and means releasably interconnecting the sections in their longitudinally aligned positions, the outer section being pivotally movable on the inner section in a different direction from the direction of pivotal movement of the inner section toward collapsed position whereby in said collapsed position, the inner section is folded inwardly adjacent to the frame while the outer section is folded inwardly against the inner section on the opposite side thereof from the frame.

6. In an apparatus for conveying relatively tender articles subject to damage by bruising and the like, a support, first and second elongated feeding conveyers having opposite sides and discharge ends, means mounting the conveyers in the support with their discharge ends in a substantially common horiozntal plane and in adjacent spaced opposed relation to each other, and an article receiver mounted in the support between and below said discharge ends means for gently transferring articles from the feeding conveyers to the receiver comprising first and second, resiliently flexible, three-sided transfer sheets having first side edges secured in the support transversely of the feeding conveyers and respectively in closely adjacent spaced relation to the discharge ends of the first and second feeding conveyers, elongated, second side edges extended between the feeding conveyers in overlapping relation to each other and in angular relation to their respective first edges and being also secured in the support in a substantially common plane with the first edges, and elongated, free edges downwardly concaved between their respective side edges, said sheets being overlapped with said free edges intersecting above said receiver whereby the sheets are resiliently flexible downwardly incident to discharge of articles from the feeding conveyers thereon and whereby such discharged articles gently gravitate along the sheets onto the receiver.

7. In an apparatus for conveying relatively tender articles subject to damage by bruising and the like, a support, first and second elongated feeding conveyers having opposite sides and discharge ends, means mounting the conveyers in the support in substantial alignment longitudinally thereof with their discharge ends in a substantially common horizontal plane and in adjacent longitudinally spaced relation to each other, and a third elongated output conveyer having a receiving end and being mounted in the support in transverse outward extension from the feeding conveyers with said receiving end positioned between and below said discharge ends; means for gently transferring articles from the feeding conveyers to the output conveyer comprising first and second flexible transfer sheets having first side edges secured in the support transversely of the feeding conveyers and respectively in closely adjacent spaced relation to the discharge ends of the first and second feeding conveyers, elongated, longitudinally aligned, second side edges extended longitudinally of the feeding conveyers and being also secured in the support in laterally offset relation from said discharge ends and on the opposite side thereof from the outward extension of said output conveyer, and elongated, free edges downwardly concaved between their respective side edges, said sheets being overlapped with said free edges intersecting above the receiving end of the third conveyer whereby the sheets are resiliently flexible downwardly incident to discharge of articles from the feeding conveyers thereon and whereby such discharged articles gently gravitate along the sheets onto the receiving end of the output conveyer.

8. The apparatus of claim 7 including a rigid, U-shaped, sheet frame mounted in the support between the discharge ends of the feeding conveyers having side portions extended transversely of and individually in closely adjacent spaced relation to the discharge ends of the feeding conveyers and an elongated central portion rigidly interconnecting the side portions and extended longitudinally of the feeding conveyers, the first side edges of the sheets being respectively connected to the side portions of the sheet frames, and the second side edges of the sheets being connected to the central portion of the sheet frame.

9. A machine for harvesting produce picked from a plurality of longitudinally extended, transversely spaced rows of such produce in a field thereof comprising an elongated frame; produce receiving means borne by the frame; an elongated feeding conveyer having an inner produce discharging end mounted on the frame in discharging relation to said receiving means and an opposite outer produce receiving end; and an extension conveyer including an elongated chute, and a bracket secured to the chute and being mounted on the outer end of the feeding conveyer for pivotal movement about an axis extended transversely of the feeding conveyer between an extended position with the chute extended outwardly and upwardly from the outer end of the feeding conveyer and a retracted position with the chute extended inwardly toward the frame in overlying relation to the feeding conveyer.

10. The machine of claim 9 wherein the feeding conveyer is mounted on the frame for pivotal movement about an upright axis between a collapsed position extended alongside of the frame and an extended position laterally outwardly projected from the frame; wherein the feeding conveyer includes an upper run in a substantially horizontal plane in said extended position of the feeding conveyer; wherein the feeding conveyer includes an elongated rod on the outer end thereof in upwardly spaced relation to said upper run; wherein the bracket of the extension conveyer is releasably hingedly hooked to the rod; and wherein the chute provides an inner end in abutment with the feeding conveyer in the extended position of the extension conveyer whereby the extension conveyer is in feeding alignment with the feeding conveyer.

11. The machine of claim 9 wherein the feeding conveyer includes inner and outer sections pivotally interconnected for pivotal movement about an upright axis, wherein the feeding conveyer is mounted on the frame for pivotal movement about an upright axis substantially parallel to the axis of pivotal connection of the sections, wherein the outer end of the feeding conveyer is on said outer section whereby the sections of the feeding conveyer are horizontally swingable between a collapsed position with the inner section extended alongside of the frame and an extended position laterally outwardly extended from the frame transversely of the rows of produce, the outer section of the feeding conveyer being pivotal against the inner section in said collapsed position and being on the opposite side of the inner section from the frame, and the extension conveyer being pivotal into its retracted position when the feeding conveyer is in its collapsed position.

12. The harvester of claim 1 including first and second, resiliently flexible, three-sided transfer sheets having first side edges secured to the frame transversely of the feeding conveyers and individually closely adjacent to the discharge ends thereof, elongated, second side edges extended between the feeding conveyers in overlapping relation to each other and in a substantially common plane with the first edges, and elongated, free edges downwardly concaved between their respective side edges and in closely adjacent, upwardly spaced relation to the delivery chute, said sheets being overlapped with their free edges intersecting above the chute and in an upright plane substantially longitudinally bisecting the elevating conveyer whereby the sheets are resiliently flexible downwardly incident to discharge of produce from the feeding conveyers thereon and whereby such discharged articles gently gravitate along the sheets onto the elevating conveyer, the delivery chute limiting said downward flexing of the sheets.

13. In an apparatus for conveying relatively tender articles subject to damage by bruising and the like, a support, first and second elongated feeding conveyers having opposite sides and discharge ends, means mounting the conveyers in the support with their discharge ends in a substantially common horizontal plane and in adjacent spaced opposed relation to each other, and an article receiver mounted in the support between and below said discharge ends; means for gently transferring articles from the feeding conveyers to the receiver comprising first and second, resiliently flexible, three-sided transfer sheets having first side edges secured in the support transversely of the feeding conveyers and respectively in closely adjacent spaced relation to the discharge ends of the first and second feeding conveyers; elongated, second side edges extended between the feeding conveyers in overlapping relation to each other and in angular relation to their respective first edges and being also secured in the support in a substantially common plane with the first edges, elongated, free edges downwardly concaved between their respective side edges, said sheets being overlapped with said free edges intersecting above said receiver whereby the sheets are resiliently flexible downwardly incident to discharge of articles from the feeding conveyers thereon; and a deflector panel rigidly mounted in the support in closely adjacent downwardly spaced relation to the transfer sheets to limit downward flexing thereof incident to discharge of articles thereon whereby such discharged articles gently gravitate along the sheets onto the receiver.

References Cited in the file of this patent

UNITED STATES PATENTS

| | | |
|---|---|---|
| 82,135 | Lockhart | Sept. 15, 1868 |
| 1,005,049 | Lorenzen | Oct. 3, 1911 |
| 1,044,329 | Wood | Nov. 12, 1912 |
| 1,987,916 | Thompson | Jan. 15, 1935 |
| 2,066,866 | White | Jan. 5, 1937 |
| 2,136,516 | Martin | Nov. 15, 1938 |
| 2,321,387 | Jackson | June 8, 1943 |
| 2,732,961 | Ervin | Jan. 31, 1956 |
| 2,815,853 | Likens | Dec. 10, 1957 |

FOREIGN PATENTS

| | | |
|---|---|---|
| 645,422 | France | June 27, 1928 |